Jan. 3, 1950     N. H. ABRAMS     2,493,098
WATER METER
Filed Feb. 28, 1947

Inventor
Norman H. Abrams
By
Attorney

Patented Jan. 3, 1950

2,493,098

UNITED STATES PATENT OFFICE 2,493,098

WATER METER

Norman H. Abrams, Waco, Tex., assignor to Badger Meter Manufacturing Company, Milwaukee, Wis., a corporation of Wisconsin Application February 28, 1947, Serial No. 731,447

1 Claim. (Cl. 73—272)

This invention relates to a water meter and more particularly to the protection of the upper pawl and spindle of the enclosed gear box type of meter against corrosion and breakage.

In this type of water meter it has been the practice to mount the gear box directly on the measuring chamber which is clamped inside the main housing. The drive from the gear box to the outer counter mechanism, which latter is disposed in a separate casing on the main housing, is through a pawl and spindle connection which provides for eccentricity in the installation and is normally exposed to the water flowing through the main housing.

An item of substantial maintenance has existed for this type of meter by reason of the breakage of spindle shafts attributable to corrosion resulting largely from electrolytic causes. The spindle shaft is generally of different alloy material from that of the pawls and of the gear box and housing, which enhances the corrosion.

The present invention is based upon the discovery that if the pawl and yoke can be kept lubricated by a suitable oil or grease, substantially all of the objectionable corrosion is eliminated.

One of the principal objects of the present invention is to provide a water meter of the type referred to in which the pawl and spindle shaft are lubricated and protected from corrosion.

Another object of the invention is to provide an enclosure for the pawl and spindle shaft coupling which is adaptable for assembly purposes without requiring accurate concentricity of the members.

A more specific object is to provide a seal for enclosing the drive coupling between the gear box and the counter.

According to the invention, a web encircles the coupling and extends between the gear box and the main housing. The web is sealed at its opposite ends against the gear box and housing by means of a cushion member having substantial give to provide for eccentricity of the meter parts and for possible vibration of the gear box in service.

An embodiment of the invention is illustrated in the accompanying drawing in which.

Figure 1:
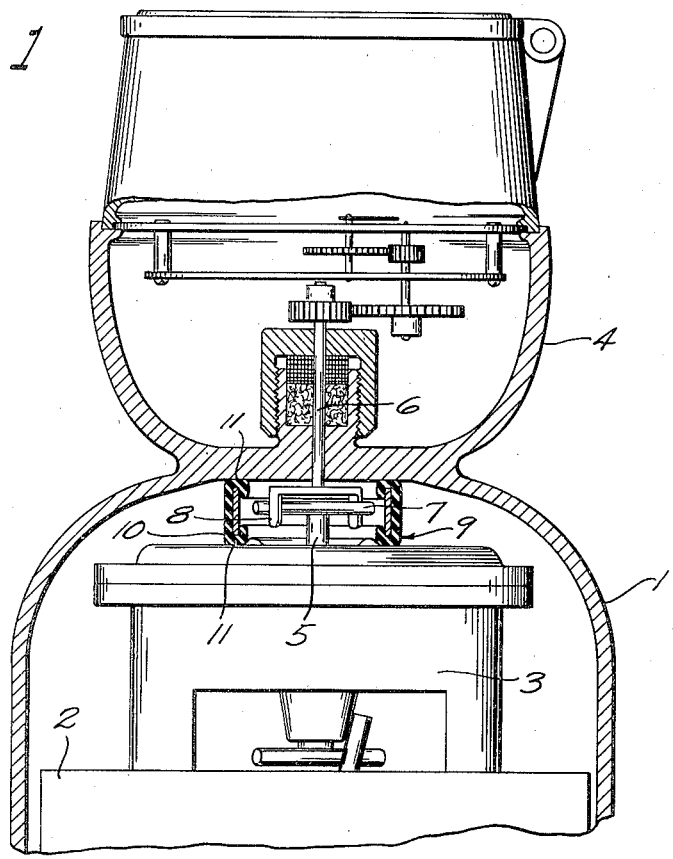
Figure 1 is a vertical section through a part of a water meter.
Figure 2:
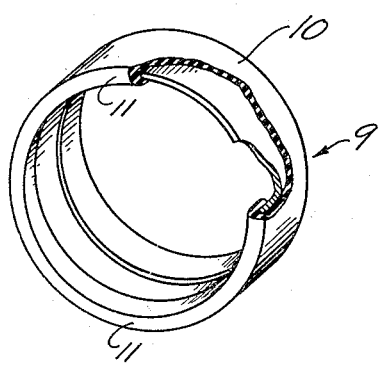
Fig. 2 is an enlarged perspective view of the sealing web with parts broken away and sectioned to illustrate the seal at its ends.

The water meter comprises, in general, a main housing 1 in which is clamped the measuring chamber 2, a gear box 3 mounted on the chamber and containing the transmission gearing for the meter, and a counter housing 4 on top of housing 1 and usually integral therewith and which contains the counter mechanism and dials for the meter.

The drive shaft 5 extends upwardly from the gear box 3 centrally thereof and is driven by the transmission gearing inside the box.

The spindle shaft 6 for the counter extends downwardly through the main housing wall 1 from the counter mechanism in housing 4 and is sealed against wall 1 by any suitable means to prevent leakage of water into the counter housing.

Shafts 5 and 6 are disposed in substantial alignment and are coupled together by means of a drive bar 7 on the upper end of shaft 5 which engages a double pawl yoke 8 on the lower end of shaft 6 to drive the same. The coupling provides for substantial misalignment and eccentricity of the shafts 5 and 6 without variation of the driving connection between the two.

In carrying out the invention, a vertical tubular web member 9 extends between the top of gear box 3 and the inside wall of housing 1 beneath housing 4, and encloses the coupling for shafts 5 and 6.

The web 9 preferably comprises a cylindrical metal shell surrounded on the outside by a "Neoprene" or other oil resistant rubber-like shell 10 which extends beyond and over the ends of the metal shell to provide end cushion members 11 which seal the web against the corresponding housing 1 and box 3.

The web 9 need not be located accurately in the housing 1 and may be adjusted in assembly to prevent interference with the coupling of shafts 5 and 6 and to accommodate the final relative position of the gear box 3 and housing 1.

The enclosure inside the web 9 may be substantially filled with grease, thereby providing for the permanent lubrication of the coupling members. The seals 11 substantially prevent infiltration of water into the enclosure. However, in the event water should leak into the enclosure, the lubrication of the coupling and shaft members substantially prevents electrolytic corrosion of the same.

Where the gear box vibrates in operation of the meter, the seals 11 have sufficient yieldability to prevent leakage and serve to retain the web in place.

The construction reduces maintenance problems and provides a simple, inexpensive means of protecting the coupling and shafts from corrosion and breakage.

Various embodiments of the invention may be employed within the scope of the accompanying claim.

I claim:

A water meter comprising a main meter housing enclosing a plurality of chambers separated by a wall having an aperture, a counter on one side of said wall, a metering chamber secured within said housing, a substantially closed transmission gear box mounted on the metering chamber and spaced from the wall of said housing on the side opposite the counter, a drive shaft extending from said gear box toward said counter, a driven shaft from the counter extending through said wall aperture toward the gear box, a coupling for said shafts disposed outside the gear box and between it and the wall, and a lubricant retaining tubular resilient member closely encircling said coupling and clamped between said gear box and said wall in sealing relation thereto, said coupling and said enclosing member being constructed to provide for minor misalignment and lateral offsetting of said gear box within the housing and of the respective shafts.

NORMAN H. ABRAMS.

REFERENCES CITED

The following references are of record in the file of this patent:

UNITED STATES PATENTS

| Number | Name | Date |
|---|---|---|
| 1,174,359 | Shaffer et al. | Mar. 7, 1916 |
| 1,941,649 | Bassett | Jan. 2, 1934 |
| 2,284,511 | Chrisman | May 26, 1942 |